United States Patent
Kreuzer

(10) Patent No.: US 6,280,674 B1
(45) Date of Patent: Aug. 28, 2001

(54) MANUFACTURING METHOD FOR A STEERING WHEEL

(75) Inventor: Martin Kreuzer, Kleinwallstadt (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/498,179

(22) Filed: Feb. 4, 2000

(30) Foreign Application Priority Data

Feb. 5, 1999 (DE) ............................................ 199 04 746

(51) Int. Cl.[7] .................................................... B29C 39/26
(52) U.S. Cl. ................... 264/259; 29/894.1; 264/271.1; 264/313; 264/317
(58) Field of Search ................................... 264/221, 317, 264/46.4, 271.1, 259, 313; 29/894.1

(56) References Cited

U.S. PATENT DOCUMENTS

| | | | |
|---|---|---|---|
| 4,863,771 | * 9/1989 | Freeman | 264/314 |
| 5,207,964 | * 5/1993 | Mauro | 264/221 |
| 5,560,264 | * 10/1996 | Xolin et al. | 29/894.1 |
| 5,792,302 | * 8/1998 | Nakada et al. | 264/259 |
| 5,804,121 | * 9/1998 | Gallagher | 264/259 |
| 5,921,312 | * 7/1999 | Carden | 164/369 |
| 6,098,286 | * 8/2000 | Kreuzer | 264/313 |

* cited by examiner

Primary Examiner—Allan R. Kuhns
(74) Attorney, Agent, or Firm—Tarolli, Sundheim, Covell, Tummino & Szabo L.L.P.

(57) ABSTRACT

To produce a steering wheel having a wheel skeleton with a hub, a rim and spokes interconnecting the hub and the rim, a shaped body of a dissolvable material and corresponding in shape to an airbag module is attached to the hub. The skeleton with the shaped body is placed in a mold. A plasticized molding material is molded around the rim and the spokes and over the shaped body forming a steering wheel body with a seamless casing. The steering wheel body is removed from the mold. The shaped body is then dissolved and removed, leaving a hollow space for accommodation of the airbag module.

7 Claims, 2 Drawing Sheets

MANUFACTURING METHOD FOR A STEERING WHEEL

The present invention relates to a method of producing a steering wheel with a seamless casing surrounding a wheel skeleton.

BACKGROUND OF THE INVENTION

The majority of the casings of steering wheels with integrated airbag are constructed today in two parts, with a shaped part surrounding the steering wheel skeleton and with a separately produced covering for the airbag installation opening in the hub region of the steering wheel, great efforts being made to match the two parts with each other in their visual appearance and haptic characteristics. Considerable further difficulties result from the fact that the airbag covering must be constructed so as to be able to be torn open and so as to be movable relative to the steering wheel hub about the touch path necessary to actuate the horn.

As a gap between the shaped part surrounding the steering wheel and the airbag covering is regarded as visually disadvantageous, it has already been proposed to produce the shaped part and airbag covering in one piece. Owing to the tear-open- and actuating functions to be taken into account in the region of the airbag coverings, such methods present certain substantially solvable difficulties with regard to manufacturing technique and automatically require a largely new design of the steering wheel construction, because assembly can only take place from the reverse side of the steering wheel and because special precautions have to be taken for the introduction of the airbag module with folded gas bag and gas generator. Rather, one has found a way to divide the steering wheel skeleton into a base part with hub and possibly spoke stumps, which can be equipped with the airbag module and other function parts, before the steering wheel rim with spokes or spoke stumps and covering in a single piece is put in place and connected with the base part.

It is regarded as particularly disadvantageous here that the fastening between the base part and the steering wheel rim is connected with an additional expenditure of material, which goes against the general aim of saving weight in vehicle construction. In addition, it is difficult to match the two components optimally to each other with regard to size. In particular, the folded gas bag is equipped as a shaped part with considerable tolerances, so that the coordination of the covering region is not simple, which—as it has to be able to be torn open—must not have any particular inherent rigidity and therefore requires the folded gas bag as a support. If the gas bag set is too "thin", the covering is not sufficiently supported; if it is too "thick", it is buckled upwards. Both are undesirable.

Similar problems occur with regard to the actuating movements which have to be transferred from the exterior over the plastic shaped part constructed in one piece on the steering wheel rim onto the actuating members mounted in the base part. It should be readily clear that the adaptation of a surface produced by casting mold technique to a mounted surface is very costly in terms of manufacturing technique and that the transfer functions can only be carried out with reliable operation when very close tolerances can be maintained in the adaptation.

BRIEF DESCRIPTION OF THE INVENTION

Present invention provides a method of producing a steering wheel that overcomes above-mentioned difficulties, providing a casing with a continuous surface and possibly a foamed core, avoiding any adaptation problems with a justifiable economic expenditure.

According to the invention, a shaped body of a dissolvable material is attached to the central base part of the steering wheel skeleton, thereafter the steering wheel skeleton is placed with the shaped body into a mold, the casing is molded, and then removed from the mold, and the shaped body is dissolved by addition of a solvent, thereby leaving a hollow accommodation space for the airbag module.

Through the use of a shaped body of soluble material, the casing can be produced with a hollow having an accurate fit, into which subsequently the airbag module can be introduced. The airbag module itself, owing to the "soft" surface of the gas bag set, does not come into consideration as a shaped body, because thereby the nominal rupture line necessary in the covering region of the plastic shaped part can not be formed out in a reproducible manner. On the other hand, with the shaped body of soluble material, in connection with the outer form in the casing, a very precisely dimensioned line of small wall thickness can be produced, which has a closely tolerated strength and on inflation of the gas bag tears open reliably and immediately. The production of the covering region is thereby just as simple as with a covering cap produced as a separate component, i.e. nominal tear lines which are able to be stressed sufficiently in normal operation and are able to be torn open easily in an emergency can be realized just as reinforcement inserts and components acting as a hinge. In addition, through the production in one piece, it is of course ensured that the steering wheel and covering region have the same characteristics visually and haptically.

The shaped body preferably consists of an expandable polystyrene. The shaped body can have a covering of an elastomeric plastic foil or of an elastomeric plastic net.

Toluene, xylene or methylene chloride come into consideration as solvents for the shaped body.

Thus, the invention provides a method by which not only can the difficulties which were initially mentioned be overcome, but which rather is also extremely flexible and reliable in operation.

BRIEF DESCRIPTION OF THE DRAWINGS

The method according to the invention is explained in further detail with the aid of the example embodiment illustrated in simplified form in FIGS. 1 and 2, in which.

BRIEF DETAILED DESCRIPTION OF THE DRAWINGS

Figure 1:
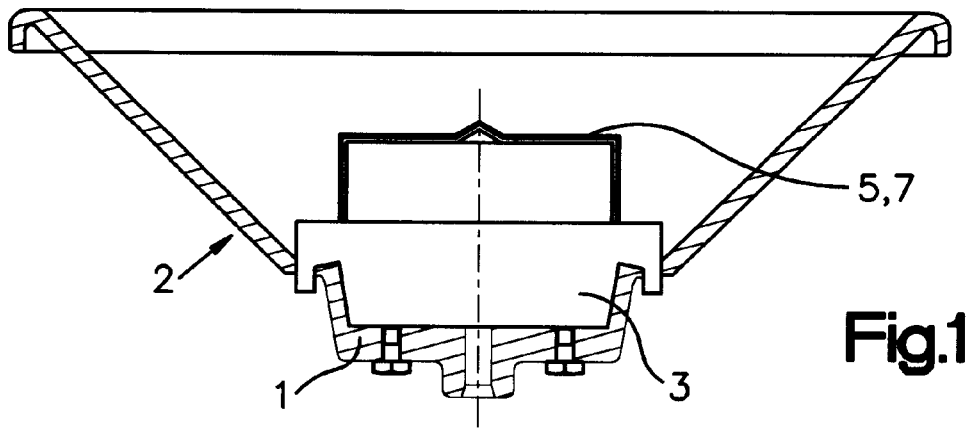
FIG. 1 shows a section through a steering wheel skeleton with shaped body.

In FIG. 1 a section is illustrated through a simplified steering wheel skeleton 2, which comprises a base part 1 to which a shaped body 3 of a dissolvable material is fastened. The shaped body 3 corresponds to the cavity which has to be kept free for the arrangement of an airbag module in the manufacture of the casing 4. The shaped body 3 can have a covering 5 in whole or in part, which can serve at the same time as a reinforcement insert 7 for the casing. The covering 5 and reinforcement insert 7 can, however, also consist of different parts and be used alternatively or together.

Figure 2:
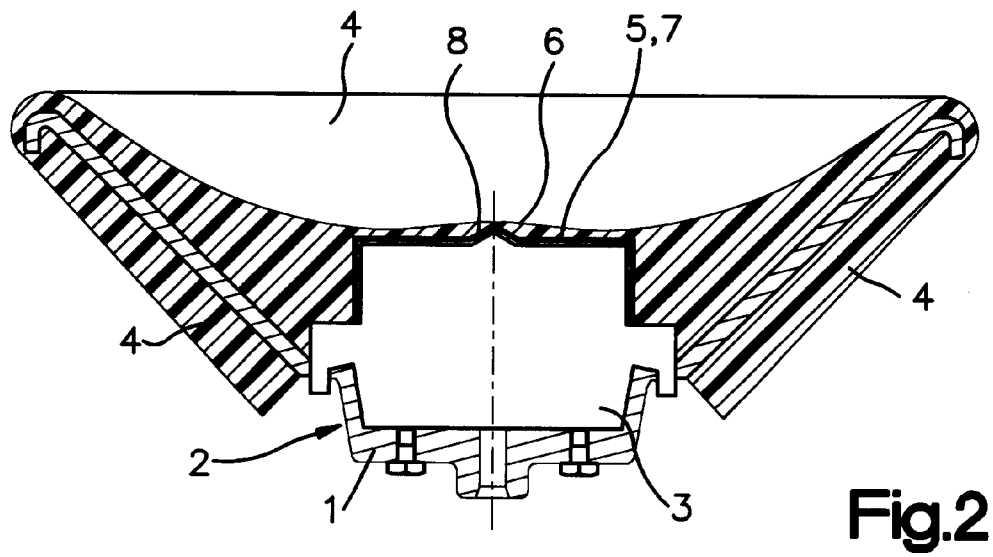
FIG. 2 shows a section through a steering wheel according to FIG. 1 with shaped body and casing.

For the production of the casing 4, which can be seen from FIG. 2, the steering wheel skeleton 2 with the shaped body 3 according to FIG. 1 is placed in a manner known per se into a corresponding mold. Then the material required for the casing 4 is introduced into the mold, where it f ills the mold cavity and surrounds the steering wheel skeleton 2 and the shaped body 3 substantially on all sides. In so doing, the usual plastics which have proved successful for the production of a steering wheel casing can be used. When the material injected into the mold for the production of the casing has reacted or hardened and the casing has obtained its final, unchangeable form, the steering wheel skeleton 2 with shaped body 3 and casing 4 can be removed from the mold. Then the product according to FIG. 2 is acted upon by a suitable solvent, the shaped body 3 being completely dissolved, i.e. converts into the fluid or gaseous aggregate state and can be removed from the mold cavity for the airbag module. There remains a steering wheel skeleton 2 with a casing 4 and also possibly with a covering 5 of an elastomeric plastic foil or of an elastomeric plastic net or with a reinforcement insert of a plastic fabric, a plastic net, a perforated metal- or plastic foil or the like. The casing 4 has a weakening line 8 in the region, of the airbag covering 6, along which the airbag covering 6 tears open on activation of the airbag module. Along the weakening line 8, the material of the casing 4 has a smaller thickness and the reinforcement insert 7 is omitted here or interrupted and thereby weakened to such an extent that the tearing open of the casing 4 along the weakening line 8 is not impeded.

Figure 3:
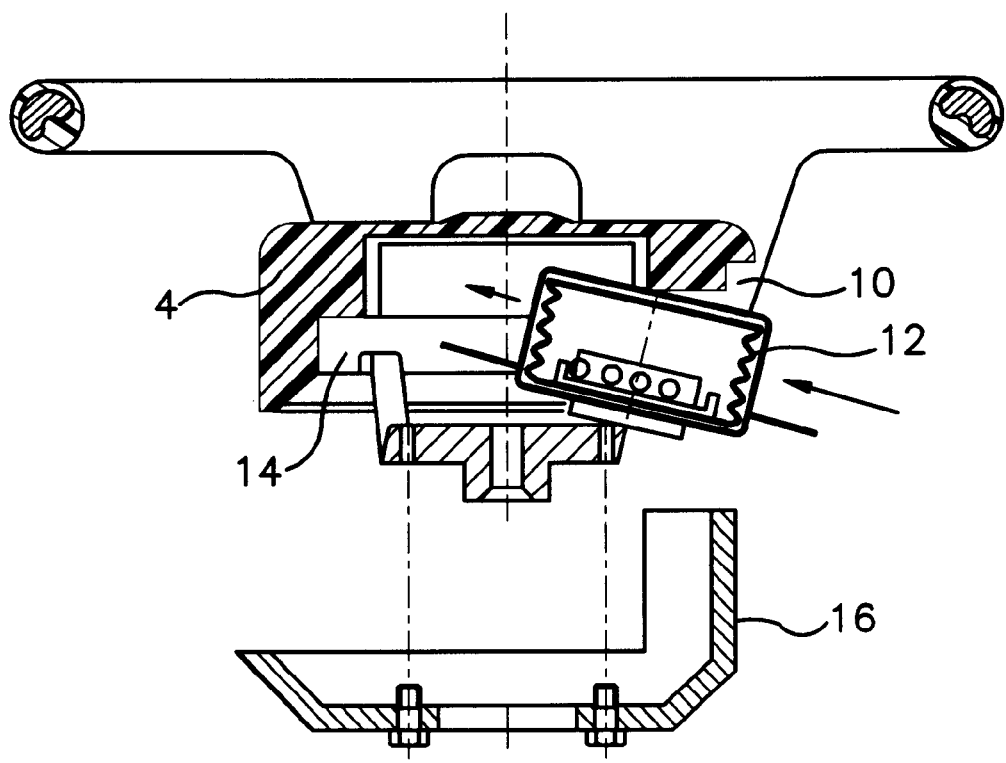
FIG. 3 shows the manner in which an airbag module is mounted.

As seen in FIG. 3, the casing 4 is molded with a lateral opening 10 permitting introduction of an airbag module 12, after removal of the shaped body, into the hollow space 14 thus formed.

What is claimed is:

1. A method of producing a steering wheel having a wheel skeleton with a hub, a rim and spokes interconnecting the hub and the rim, wherein a shaped body of a dissolvable material and corresponding in shape to an airbag module is attached to said hub, the skeleton with the shaped body is placed in a mold, a plasticized molding material is molded around said rim and said spokes and over said shaped body forming a steering wheel body with a seamless casing, said steering wheel body is removed from the mold, the shaped body is dissolved and removed, leaving a hollow space for accommodation of said airbag module, and the shaped body is formed of an expandable polystyrene.

2. A method of producing a steering wheel having a wheel skeleton with a hub, a rim and spokes interconnecting the hub and the rim, wherein a shaped body of a dissolvable material and corresponding in shape to an airbag module is attached to said hub, the skeleton with the shaped body is placed in a mold, a plasticized molding material is molded around said rim and said spokes and over said shaped body forming a steering wheel body with a seamless casing, said steering wheel body is removed from the mold, the shaped body is dissolved and removed, leaving a hollow space for accommodation of said airbag module, and the shaped body is provided with a covering of an elastomeric material.

3. A method of producing a steering wheel having a wheel skeleton with a hub, a rim and spokes interconnecting the hub and the rim, wherein a shaped body of a dissolvable material and corresponding in shape to an airbag module is attached to said hub, the skeleton with the shaped body is placed in a mold, a plasticized molding material is molded around said rim and said spokes and over said shaped body forming a steering wheel body with a seamless casing, said steering wheel body is removed from the mold, the shaped body is dissolved and removed, leaving a hollow space for accommodation of said airbag module, and the shaped body is dissolved with a solvent comprising one of toluene, xylene and methylene chloride.

4. A method of producing a steering wheel having a wheel skeleton with a hub, a rim and spokes interconnecting the hub and the rim, wherein a shaped body of a dissolvable material and corresponding in shape to an airbag module is attached to said hub, the skeleton with the shaped body is placed in a mold, a plasticized molding material is molded around said rim and said spokes and over said shaped body forming a steering wheel body with a seamless casing, said steering wheel body is removed from the mold, the shaped body is dissolved and removed, leaving a hollow space for accommodation of said airbag module, and the steering wheel body is introduced with the shaped body into a solvent bath.

5. A method of producing a steering wheel having a wheel skeleton with a hub, a rim and spokes interconnecting the hub and the rim, wherein a shaped body of a dissolvable material and corresponding in shape to an airbag module is attached to said hub, the skeleton with the shaped body is placed in a mold, a plasticized molding material is molded around said rim and said spokes and over said shaped body forming a steering wheel body with a seamless casing, said steering wheel body is removed from the mold, the shaped body is dissolved and removed, leaving a hollow space for accommodation of said airbag module, and the shaped body is dissolved by application of solvent vapors.

6. A method of producing a steering wheel having a wheel skeleton with a hub, a rim and spokes interconnecting the hub and the rim, wherein a shaped body of a dissolvable material and corresponding in shape to an airbag module is attached to said hub, the skeleton with the shaped body is placed in a mold, a plasticized molding material is molded around said rim and said spokes and over said shaped body forming a steering wheel body with a seamless casing, said steering wheel body is removed from the mold, the shaped body is dissolved and removed, leaving a hollow space for accommodation of said airbag module, and the casing has a central cover area provided with a reinforcement by an embedded structure.

7. A method of producing a steering wheel having a wheel skeleton with a hub, a rim and spokes interconnecting the hub and the rim, wherein a shaped body of a dissolvable material and corresponding in shape to an airbag module is attached to said hub, the skeleton with the shaped body is placed in a mold, a plasticized molding material is molded around said rim and said spokes and over said shaped body forming a steering wheel body with a seamless casing, said steering wheel body is removed from the mold, the shaped body is dissolved and removed, leaving a hollow space for accommodation of said airbag module, and said casing is molded with a lateral opening for introduction of said airbag module.

* * * * *